April 22, 1952  R. D. MILLER  2,593,592
GRILL
Filed Oct. 11, 1946
FIG. 1.
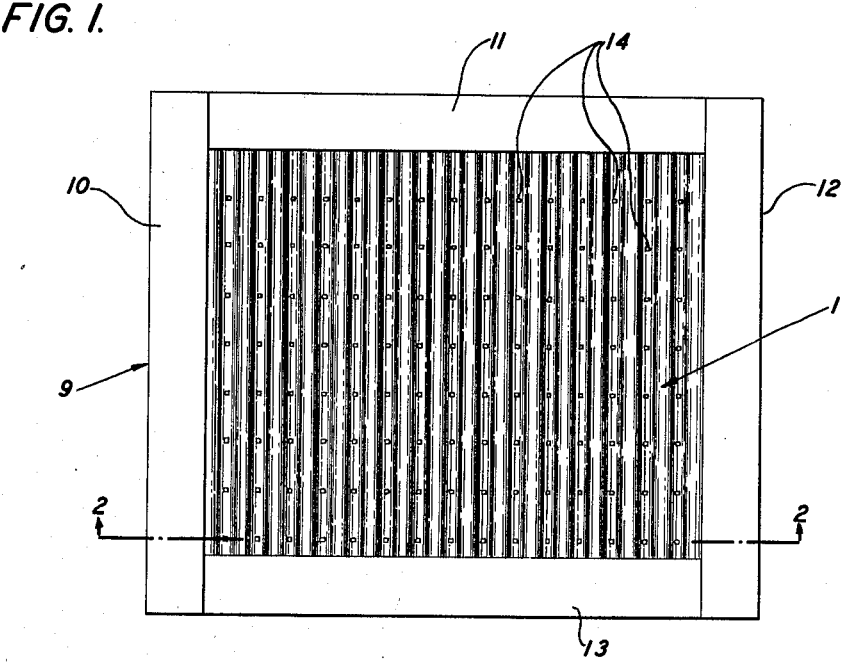
FIG. 2.
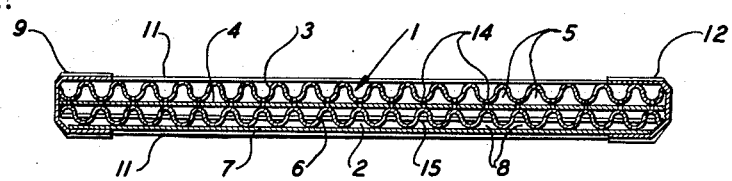
FIG. 3.
INVENTOR.
RICHARD D. MILLER
BY
Christie & Angus
ATTORNEYS Patented Apr. 22, 1952

2,593,592

UNITED STATES PATENT OFFICE 2,593,592

GRILL

Richard D. Miller, Pasadena, Calif.

Application October 11, 1946, Serial No. 702,631

7 Claims. (Cl. 99—446)

This invention relates to pads or mats and more particularly to mats of the type adapted for use in the broiling or cooking of greasy or fatty foods such as steaks and chops.

In the broiling of steaks and chops and the like, the grease and fat in the meat drips and tends to smoke and even catch fire. When such cooking is done indoors, as on a kitchen range, it is common to place a grease pan below the broiler into which the grease drips. During the cooking operation, the grease in the pan, if it does not catch fire, commonly smokes thereby smoking up the room. Furthermore, the grease which drips into the pan and solidifies must be removed at frequent intervals, which is an unpleasant task.

In accordance with my invention, I provide means for minimizing the tendency toward smoking and catching fire of the grease and provide easy means for disposing of it, thereby avoiding the necessity for catching it and disposing it from a grease pan.

I carry out my invention by the provision of a mat, resistant to fire, and constructed to catch and absorb the grease. The mat will be placed below the meat or food being cooked or broiled so that the melted grease or fat will drop onto the mat and be absorbed by it. The mat is constructed of a plurality of sheets of a heat resistant, grease absorptive, material such as a fibrous asbestos or the like; and the sheets comprising the mat are arranged to provide spaces for ready passage and absorption of the grease into the fibers.

A feature of the construction is the provision of corrugations providing the spaces; and a related feature is the provision of holes through an upper sheet through which some of the grease may pass to a lower sheet. The assembly of the sheets forming the mat is held together by suitable fastening means.

According to a preferred embodiment, I provide a relatively flat sheet between corrugated sheets.

A feature which may be desirable but optional to use, is the provision of a heat reflecting surface or foil on the upper sheet, such as an aluminum foil. This will have the advantage of reflecting sufficient of the heat so that the material of the fibrous absorptive sheets below will not char or catch fire, and even though it would otherwise char or catch fire if exposed to the heat or flame. This will allow the use of a cheaper fibrous material than asbestos, for example cardboard.

The foregoing and other features of my invention will be better understood from the following detailed description and the accompanying drawing of which:

Fig. 1 is a top plan view of a mat according to my invention;

Fig. 2 is an elevation view in cross section taken at line 2—2 of Fig. 1;

Fig. 3 is a cross section view similar to that of Fig. 2 showing part of a mat, but modified to provide a heat reflecting foil or sheet.

Referring to the mats shown in Figs. 1 and 2, the mat comprises a sheet of corrugated fibrous material 1 containing an upper layer of fibrous material such as asbestos, and a lower sheet 2 of similar material. The layer 1 comprises a corrugated strip or sheet 3 backed by a flat sheet 4 thereby providing air spaces 5 therebetween. The lower layer 2, similarly comprises a corrugated sheet 6 and a flat backing sheet 7 with air spaces 8 therebetween.

The layers are held together by a border 9 comprising four strips 10, 11, 12 and 13, which may be of a similar fibrous heat resistant material like that of the mat. These four strips are attached as by a heat resistant cement or the like, along the respective four sides of the mat. The strip 11, for example, is folded over one of the long edges of the mat, lying flat against the top and bottom layer as shown and cemented thereto. The strip 13 is similarly fastened to the opposite side. The strips 9 and 12 are similarly folded around and glued or cemented to the opposite two edges and over the extremities of the respective strips 11 and 13 as shown. In this way, the mat is held together.

A number of holes 14 are provided through the upper layer 1, these holes being placed in the troughs of the corrugations of the sheet 3 so that grease running down into the corrugations and not immediately absorbed by the fibers of the upper layer, will run down to the lower layer for absorption there.

An optional feature which may sometimes be desirable is the provision of reinforcement to maintain the mat fairly flat against falling out of shape. These reinforcements may take the form of a number of wires 15 passing lengthwise through the corrugations of the lower layer 2 as shown in Fig. 2; and a number of these wires may be laid parallel to each other.

In the modifications shown in Fig. 3, the mat is constructed very similar to that of Figs. 1 and 2, being provided with the upper layer 1 and lower layer 2 and the binding border 9. The difference in Fig. 3 is that the upper surface of the corrugated sheet 3 is covered by a heat resistant reflecting surface 16 such as an aluminum foil.

The foil or sheet 16 may be cemented or otherwise suitably fastened. The surface 16 will reflect much of the heat from the fire above it, thereby protecting the sheets below from burning. This will allow the use of other materials than fire proof materials for the fibrous parts of the layers 1 and 2. For example, a more ordinary form of fibrous cardboard may be used without burning. If desired, the tops of the border 9 may likewise be covered with foil strips 16a. The provision of the holes 14 passing through the reflecting strip 16 as well as through the layer 1, will allow grease to drop through the holes on to the lower layer 2 as in the case of Figs. 1 and 2.

It will be recognized that by my invention I have provided a highly useful absorptive mat over which or on which may be placed a steak or chop or the like for broiling by a flame above it; and that the mat will receive and absorb the grease dripping down without burning or appreciable smoking. When the meat or the like is cooked, the mat may be disposed of, thereby avoiding the necessity for cleaning up the grease which has dropped.

I claim:

1. A mat comprising corrugated layers of heat resistant fibrous material adapted to absorb grease, one of the layers having a hole through which grease can flow to a lower layer.

2. A grease absorbing mat comprising alternate corrugated and flat layers of asbestos, the upper corrugated layer of asbestos having holes in the corrugations to allow grease to pass through to a lower layer.

3. A grease absorbing mat comprising alternate corrugated and flat layers of asbestos, the upper corrugated layer of asbestos having holes in the corrugations to allow grease to pass through to a lower layer, and strips of heat resistant material disposed over and affixed to the edges of the upper and lower layers so as to bind the layers together.

4. A device for holding food during broiling which comprises a mat of absorbent material having at least one face covered with heat-reflecting metal foil, the foil being perforated to permit liquids exuded from the food during cooking to be absorbed in the mat.

5. A device for holding food during broiling which comprises an absorbent mat of combustible material having at least one face covered with heat-reflecting metal foil, the foil being perforated to permit liquids exuded from the food during cooking to be absorbed in the mat.

6. A mat for absorbing grease produced in cooking food comprising a corrugated layer of fibrous material adapted to absorb the grease, and a heat-reflecting foil covering at least one face of the layer, the foil being perforated to permit liquids exuded from the food during cooking to be absorbed in the fibrous material.

7. A cooking mat for absorbing grease comprising a corrugated sheet faced with flat sheets, the sheets being adapted to absorb the grease, a heat-reflecting metal foil covering at least one of the flat sheets, the foil being perforated to permit liquids exuded from food during the cooking on the mat to be absorbed in the mat, and means for holding the sheets and foil together.

RICHARD D. MILLER.

REFERENCES CITED

The following references are of record in the file of this patent:

UNITED STATES PATENTS

| Number | Name | Date |
|---|---|---|
| 206,099 | Fisher | July 16, 1878 |
| 990,299 | Schlisske | Apr. 25, 1911 |
| 1,245,670 | Brown | Nov. 6, 1917 |
| 1,466,462 | Bachman | Aug. 28, 1923 |
| 1,654,137 | McMillan | Dec. 27, 1927 |
| 1,704,175 | Coale | Mar. 5, 1929 |
| 1,988,087 | Peron | Jan. 15, 1935 |
| 2,042,070 | McCaskell | May 26, 1936 |
| 2,051,960 | McCaskell | Aug. 26, 1936 |
| 2,075,679 | Weber | Mar. 30, 1937 |
| 2,091,918 | Finck | Aug. 31, 1937 |
| 2,173,815 | Slisz et al. | Sept. 19, 1939 |
| 2,177,166 | Bemis | Oct. 24, 1939 |
| 2,248,198 | Ratz | July 8, 1941 |
| 2,297,914 | Pino | Oct. 6, 1942 |
| 2,431,063 | McGahey | Nov. 18, 1947 |

FOREIGN PATENTS

| Number | Country | Date |
|---|---|---|
| 477,980 | Great Britain | Apr. 7, 1936 |